No. 838,444. PATENTED DEC. 11, 1906.
J. H. PADGETT.
BEEHIVE.
APPLICATION FILED DEC. 14, 1905.
2 SHEETS—SHEET 1.
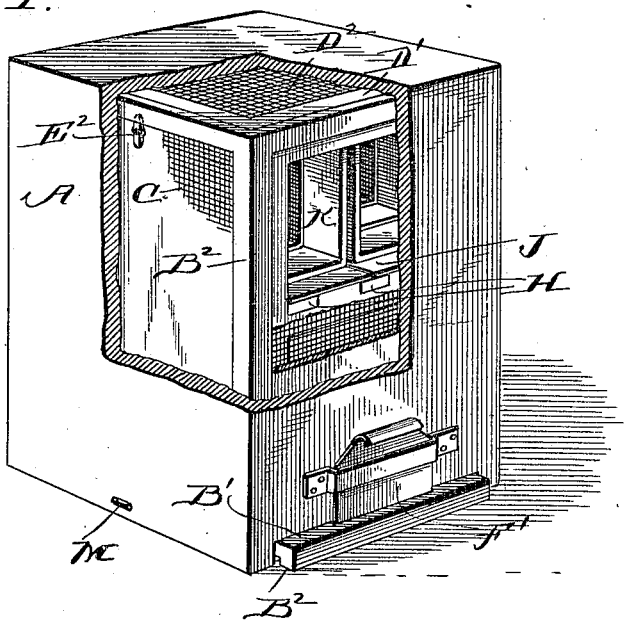
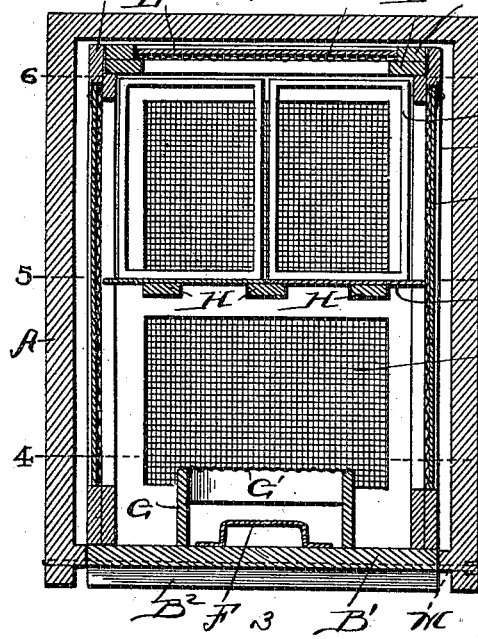
Witnesses:
Inventor:
J. H. Padgett,
By O'Meara & Brock
Attorneys.

No. 838,444. PATENTED DEC. 11, 1906.
J. H. PADGETT.
BEEHIVE.
APPLICATION FILED DEC. 14, 1905.
2 SHEETS—SHEET 2.
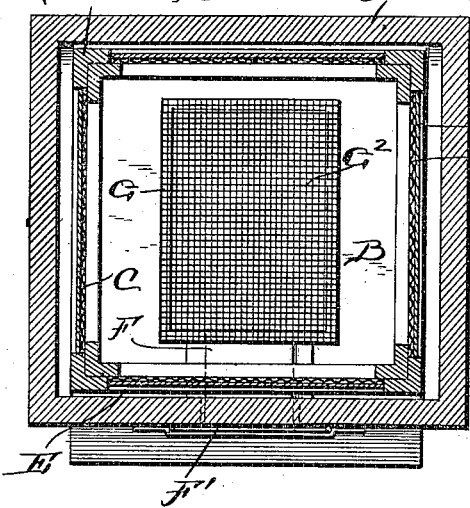
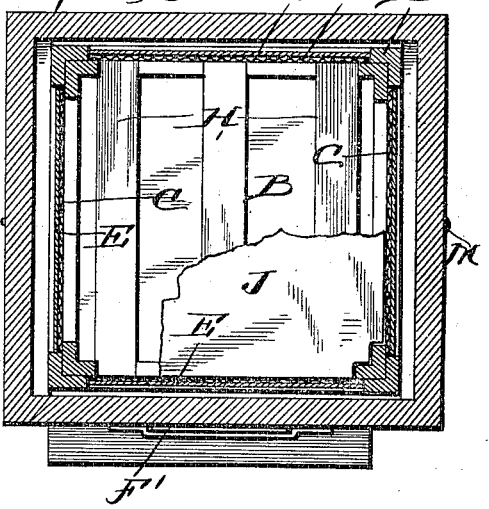
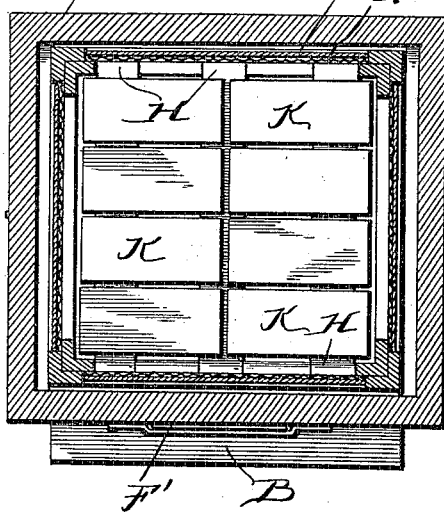
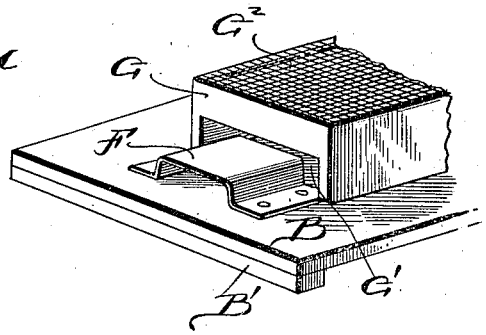
Witnesses:
Inventor:
J. H. Padgett,
By Oinear & Brock
Attorneys.

UNITED STATES PATENT OFFICE.

JOHN H. PADGETT, OF KNOXVILLE, TENNESSEE.

BEEHIVE.

No. 838,444.  Specification of Letters Patent.  Patented Dec. 11, 1906.

Application filed December 14, 1905. Serial No. 291,719.

*To all whom it may concern:*

Be it known that I, JOHN H. PADGETT, a citizen of the United States, residing at Knoxville, in the county of Knox and State of Tennessee, have invented a new and useful Improvement in Beehives, of which the following is a specification.

This invention relates to a beehive; and the object of the invention is to provide a hive with an outer and inner casing, the inner casing being partially formed of wire-netting and spaced from the outer casing, thereby securing a free circulation of air between the casings, and thus maintaining an even temperature throughout the beehive, permitting a view of the interior of the hive when the outer casing is removed and also preventing the bees from building comb upon the walls of the hive, the wire-netting being normally closed by solid panels arranged upon the outer face of the wire-netting, and thus not accessible to the bees and readily movable when it is desired to view the interior of the hive.

The invention consists also of the novel features of construction hereinafter fully described, pointed out in the claims, and shown in the accompanying drawings, in which—

Figure 1 is a detail perspective view of the hive, a portion of the outer and inner casings, panels, and wire-netting being broken away to show the interior construction. Fig. 2 is a vertical section through the hive. Fig. 3 is a vertical section upon the line 3 3 of Fig. 2. Fig. 4 is a horizontal section upon the line 4 4 of Fig. 2. Fig. 5 is a horizontal section on the line 5 5 of Fig. 2, a portion of a removable flooring being broken out and a box being removed from the base of the hive. Fig. 6 is a horizontal section upon the line 6 6 of Fig. 2. Fig. 7 is a detail perspective view showing a portion of the base, a housing, and a removable box.

In the drawings, A represents the outer casing of the hive, which casing has solid side and top walls and is downwardly open. An inner casing B rests upon and is hinged to a base B', which base is provided with cleats $B^2$, adapted to slightly rest it above the ground. The inner casing B is cut out on each of its vertical sides and in the cut-out portion of each side is placed a wire screen C. At the top of the inner casing are arranged interior cleats D, slightly below the upper edge of the casing, and upon these cleats rests a removable frame D', which carries a wire screen $D^2$. The outer portion of the sides of the casing B are normally closed by removable solid panels E, which rest in said cut-out portions, it being understood that the screens C are set in and not flush with the outer face of the casing B. The panels E may be held in position in any desired manner, and I have shown the same as being provided with a button $E^2$ adjacent one edge, which button when in locking position will engage a suitable recess formed in the side of the cut-out portion, as will be readily understood.

A cover-board E' rests within the frame D' and upon the wire screen or top $D^2$. The cover E' is not secured in place and can be lifted out when desired.

In order to prevent the bees from having access to the space between the outer and inner casings, an entrance-way is constructed as follows: Adjacent the bottoms of the two casings and on their front sides they are cut out, the cut-out portions alining with each other and upon the base, and within this cut-out portion is arranged a housing F or conduit open at each end and through which the bees can pass in entering and leaving the hive, the outer end of this housing opening without the outer casing and the inner end opening within the inner casing. The outer casing A also carries a slidable door F', by means of which the mouth or entrance to the housing F can be closed.

Within the hive upon the base is loosely placed a box G, having the ends cut out, as shown at G', and provided with a wire top $G^2$. This box not only provides a free space within the bottom of the hive in which the bees can pass from the housing F, the inner end of which will open inside of the box G when the box is placed, as shown in Fig. 7, but the box also provides ready means for removing bees from one hive to another, as the bees collected inside of the box will cling to the inner walls of the box and to the wire top when the box is removed to be placed in another hive.

About midway the height of the casing B are placed horizontal strips H, which form an open flooring upon which honey-cases or comb-boxes K can be placed. In order to entirely separate the upper and lower portions of the hive, I also provide a removable flooring J, which fits the interior of the hive and rests upon the strips H. For convenience of handling this flooring is preferably made in two sections, as indicated in Figs. 1 and 2. To lock the outer casing to the base, the base is grooved on its under surface, as shown at L, and a rod M is run through the sides of the casing A and rests in said groove L. By drawing the rod out the casing A is unlocked from the base and may be readily lifted out of position. The inner casing is also locked to the base by means of a suitable hook B³, which will be engaged by an eye or pin of any suitable kind carried by the base B'.

It will be obvious that when in use the hive will consist of outer and inner walls spaced apart and with a covered way provided by the housing F, by which the bees can pass into the interior of the hive, and it will prevent them from getting in between the inner and outer walls. The wire screen C will also prevent the bees from reaching the panels E and building comb thereupon. By removing the outer casing A and one or more of the panels E or the cover-board E' a full view of the interior can be had. By disengaging the hook B³ the inner casing B can be thrown on its hinges, so as to uncover the base B'. In use the flooring J is placed in position upon the strips H, and the bee is confined to the lower portion of the hive until the same is stored with a supply of honey and comb for the use of the bees. The flooring is then removed either partially or entirely and the bees are given access to the upper portion of the hive and to the comb-cases K. The process of filling these cases can be readily watched by removing the panels E, and when they have been filled they can be readily removed from the hive by lifting out the frame D' without in any way disturbing the bees or honey in the lower portion of the hive.

Having thus fully described my invention, what I claim as new, and desire to secure by Letters Patent, is—

1. A beehive of the kind described comprising a removable outer casing, a hinged inner casing, a box having a wire top, and cut out at the ends, said box being arranged within the inner casing, and a housing extending between the inner and outer casings and forming a covered guideway opening outwardly upon the exterior of the outer casing and inwardly within the inner casing and within the box.

2. A beehive of the kind described comprising a base grooved on its under face, an inner casing hinged to said base, means for locking the casing against swinging movement, a vertical movable outer casing adapted to inclose the inner casing and base, a rod working through said outer casing and adapted to slide in the groove above mentioned, the inner and outer casings having alining cut-out portions, and a housing arranged in said cut-out portions and forming a covered way between the exterior of the outer casing and the interior of the inner casing.

JOHN H. PADGETT.

Witnesses:
J. A. McBATH,
A. E. WEBB.